United States Patent
Horikawa et al.

(10) Patent No.: US 11,142,606 B2
(45) Date of Patent: Oct. 12, 2021

(54) MULTICOMPONENT COPOLYMER, RUBBER COMPOSITION, CROSSLINKED RUBBER COMPOSITION AND RUBBER PRODUCT

(71) Applicant: BRIDGESTONE CORPORATION, Tokyo (JP)

(72) Inventors: Yasuo Horikawa, Tokyo (JP); Olivier Tardif, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 226 days.

(21) Appl. No.: 16/462,323

(22) PCT Filed: Nov. 13, 2017

(86) PCT No.: PCT/JP2017/040811
§ 371 (c)(1),
(2) Date: May 20, 2019

(87) PCT Pub. No.: WO2018/092733
PCT Pub. Date: May 24, 2018

(65) Prior Publication Data
US 2019/0367654 A1    Dec. 5, 2019

(30) Foreign Application Priority Data
Nov. 21, 2016  (JP) .............................. JP2016-226299

(51) Int. Cl.
*C08F 236/10* (2006.01)
*B60C 1/00* (2006.01)
*C08F 236/20* (2006.01)
*C08F 236/06* (2006.01)

(52) U.S. Cl.
CPC .............. *C08F 236/10* (2013.01); *B60C 1/00* (2013.01); *C08F 236/06* (2013.01); *C08F 236/20* (2013.01)

(58) Field of Classification Search
CPC .... C08L 23/0815; C08L 23/0838; C08L 9/06; C08L 91/00; C08L 2205/025; C08L 2203/10; B60C 1/00; C08F 236/20; C08F 236/10; C08F 4/545; C08F 210/02; C08F 297/06; C08F 2/001; C08F 212/08; C08F 236/06; C08F 2500/21; C08K 3/36; C08K 5/548; C08K 5/09; C08K 3/22; C08K 5/18; C08K 5/31; C08K 5/47
See application file for complete search history.

(56) References Cited

U.S. PATENT DOCUMENTS

| | | | |
|---|---|---|---|
| 6,235,855 B1 | 5/2001 | Arai et al. | |
| 10,053,530 B2 * | 8/2018 | Oishi | ................... C08F 236/04 |
| 2013/0197157 A1 | 8/2013 | Kaita et al. | |
| 2017/0129981 A1 | 5/2017 | Oishi et al. | |
| 2017/0137552 A1 | 5/2017 | Oishi | |
| 2018/0291132 A1 | 10/2018 | Kimura et al. | |
| 2018/0291185 A1 | 10/2018 | Horikawa et al. | |
| 2018/0305489 A1 | 10/2018 | Kimura et al. | |

FOREIGN PATENT DOCUMENTS

| | | |
|---|---|---|
| CN | 1196357 A | 10/1998 |
| EP | 0778852 A1 | 6/1997 |
| EP | 0 891 993 A1 | 1/1999 |
| EP | 0 778 852 B1 | 10/1999 |
| JP | 10-505621 A | 6/1998 |
| JP | 11-035744 A | 2/1999 |
| JP | 11-035810 A | 2/1999 |
| JP | 11-80269 A | 3/1999 |
| JP | 2010-270314 A | 12/2010 |
| JP | 2014-037499 A | 2/2014 |
| JP | 2017-075287 A | 4/2017 |
| WO | 96/07681 A1 | 3/1996 |
| WO | 2012/014455 A1 | 2/2012 |
| WO | 2015/190072 A1 | 12/2015 |
| WO | 2015/190073 A1 | 12/2015 |
| WO | 2017/064862 A1 | 4/2017 |
| WO | 2017/065299 A1 | 4/2017 |

OTHER PUBLICATIONS

International Preliminary Report on Patentability with the translation of Written Opinion dated May 21, 2019 issued by the International Bureau in international application No. PCT/JP2017/040811.
International Search Report for PCT/JP2017/040811 dated Jan. 23, 2018 [PCT/ISA/210].
Extended European Search Report dated May 25, 2020, from the European Patent Office in Application No. 17870779.0.
Search Report dated May 28, 2021, issued by the State Intellectual Property Office of the P.R.C. in application No. 2017800720201.

* cited by examiner

*Primary Examiner* — Angela C Scott
(74) *Attorney, Agent, or Firm* — Sughrue Mion, PLLC

(57) ABSTRACT

Provide is a polymer that can provide excellent toughness and weather resistance to a rubber composition and a rubber product such as a tire. The multicomponent copolymer contains a conjugated diene unit, a non-conjugated olefin unit and an aromatic vinyl unit, where a proportion of conjugated diene units bonded to a unit other than a conjugated diene unit out of the total conjugated diene units is 50% or more.

20 Claims, 2 Drawing Sheets

MULTICOMPONENT COPOLYMER, RUBBER COMPOSITION, CROSSLINKED RUBBER COMPOSITION AND RUBBER PRODUCT

CROSS REFERENCE TO RELATED APPLICATIONS

This application is a National Stage of International Application No. PCT/JP2017/040811 filed Nov. 13, 2017, claiming priority based on Japanese Patent Application No. 2016-226299 filed Nov. 21, 2016.

TECHNICAL FIELD

The present disclosure relates to a multicomponent copolymer, a rubber composition, a crosslinked rubber composition and a rubber product.

BACKGROUND

Rubber products (such as tires, conveyor belts, vibration-insulating rubbers and seismic isolation rubbers) are generally required to have high toughness, and high durability and weather resistance. In order to meet such demands, various rubber components have been developed.

For example, WO 2012/014455 A1 (PTL 1) describes a copolymer of a conjugated diene compound and a non-conjugated olefin, where the conjugated diene moiety (the moiety derived from the conjugated diene compound) has a cis-1,4 bond content of more than 70.5 mol % and the non-conjugated olefin is contained in an amount of 10 mol % or more. PTL 1 describes that this copolymer is used to produce a rubber having good crack growth resistance and good weather resistance.

CITATION LIST

Patent Literature

PTL 1: WO 2012/014455 A1

SUMMARY

Technical Problem

In the rubber industry, controlling the composition ratio of monomers used for the synthesis of a copolymer is one of the known methods for adjusting the various properties of the copolymer. However, since the conventional copolymer described in PTL 1 is a binary copolymer obtained using two types of monomers consisting of a conjugated diene compound and a non-conjugated olefin compound, there is a limit in improvement in toughness, weather resistance and other properties even if the composition ratio of the monomers is controlled.

In addition, it is generally considered that toughness, weather resistance and other properties are affected not only by the composition ratio of monomers used for the synthesis of the copolymer but also by the chain structure of units derived from each monomer constituting the copolymer. However, detailed relationships between these factors have not been sufficiently studied.

It could thus be helpful to provide a polymer that can provide excellent toughness and weather resistance to a rubber composition and a rubber product such as a tire. It also could be helpful to provide a rubber composition, a crosslinked rubber composition and a rubber product which are excellent in toughness and weather resistance.

Solution to Problem

The presently disclosed multicomponent copolymer contains a conjugated diene unit, a non-conjugated olefin unit and an aromatic vinyl unit, where a proportion of conjugated diene units bonded to a unit other than a conjugated diene unit out of the total conjugated diene units is 50% or more.

The presently disclosed rubber composition contains the presently disclosed multicomponent copolymer.

The presently disclosed crosslinked rubber composition is a crosslinked product of the presently disclosed rubber composition.

The presently disclosed rubber product contains the presently disclosed rubber composition or the presently disclosed crosslinked rubber composition.

Advantageous Effect

According to the present disclosure, it is possible to provide a polymer that can provide excellent toughness and weather resistance to a rubber composition and a rubber product such as a tire. According to the present disclosure, it is also possible to provide a rubber composition, a crosslinked rubber composition and a rubber product which are excellent in toughness and weather resistance.

DETAILED DESCRIPTION

Figure 1:
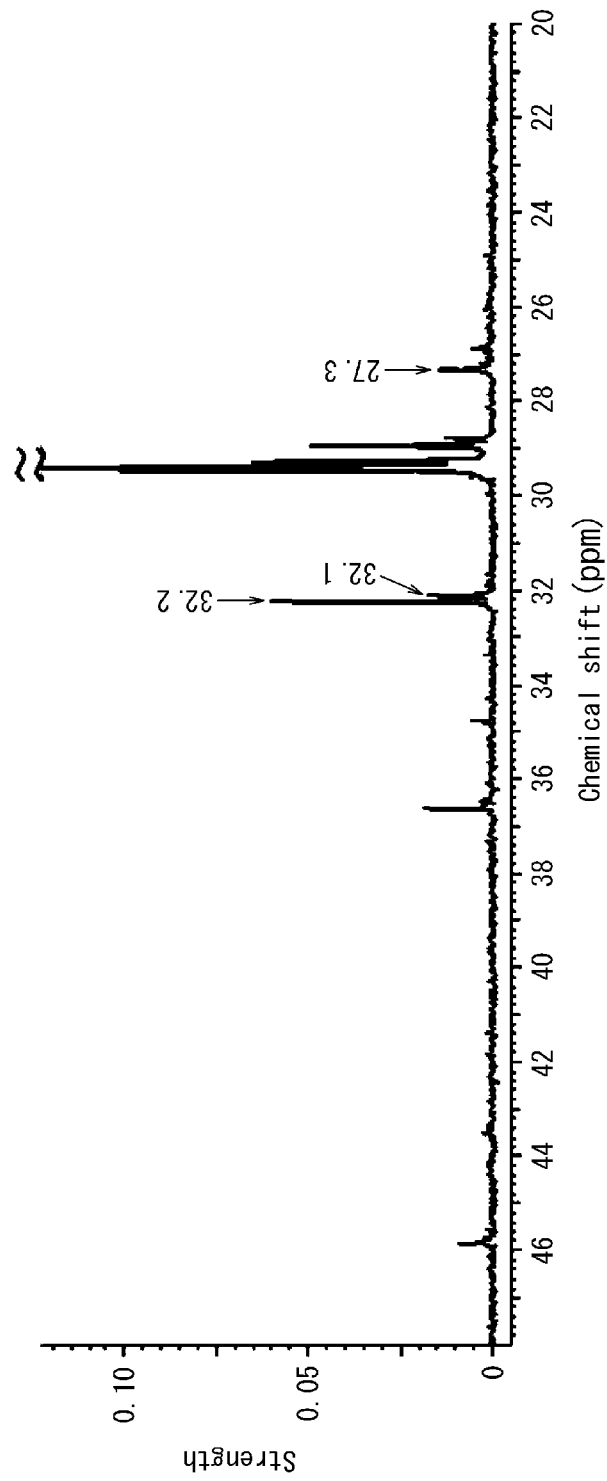
FIG. 1 illustrates a $^{13}$C-NMR spectral chart (in a range of 20 ppm to 48 ppm) of the copolymer A in the EXAMPLES section.

The following describes the present disclosure in detail based on the embodiments.

(Multicomponent Copolymer)

The presently disclosed multicomponent copolymer is a multicomponent copolymer containing a conjugated diene unit, a non-conjugated olefin unit and an aromatic vinyl unit, where a proportion of conjugated diene units bonded to a unit other than a conjugated diene unit out of the total conjugated diene units is 50% or more.

As used herein, "conjugated diene unit" refers to a unit corresponding to a unit derived from a conjugated diene compound in the copolymer, "non-conjugated olefin unit" refers to a unit corresponding to a unit derived from a non-conjugated olefin compound in the copolymer, and "aromatic vinyl unit" refers to a unit corresponding to a unit derived from an aromatic vinyl compound in the copolymer.

In addition, as used herein, "conjugated diene compound" refers to a diene compound in a conjugated system; "non-conjugated olefin compound" refers to an aliphatic unsaturated hydrocarbon and a non-conjugated compound having one or more carbon-carbon double bonds; and "aromatic vinyl compound" refers to an aromatic compound substituted with at least a vinyl group, which is not contained in the conjugated diene compound.

Furthermore, as used herein, "multicomponent copolymer" refers to a copolymer containing three or more types of monomer units, and the multicomponent copolymer can be obtained, for example, by polymerizing three or more types of monomers.

When a rubber composition or a rubber product contains the presently disclosed multicomponent copolymer, the rubber composition or the rubber product obtains excellent toughness.

We have discovered that for a molecular chain of a multicomponent copolymer containing a conjugated diene unit, a non-conjugated olefin unit and an aromatic vinyl unit, by combining more conjugated diene units with a unit other than a conjugated diene unit such as a non-conjugated olefin unit, the conjugated diene units can be distributed throughout the molecular chain without being localized, a structure with uniform crosslink density can be formed, and (sulfur) crosslink and filler reinforcement layer can be effectively formed even, for example, with a smaller amount of conjugated diene unit. It is considered that the stress applied to the copolymer can be dispersed by forming a structure with uniform crosslink density as described above, and the breaking strength and the elongation can be enhanced to improve the toughness.

In addition, when a rubber composition or a rubber product contains the presently disclosed multicomponent copolymer, the rubber composition or the rubber product obtains excellent weather resistance.

The fact that a large proportion of conjugated diene units is bonded to a unit other than a conjugated diene unit such as a non-conjugated olefin unit means that, in other words, it is an arrangement with a small number of chain structures of conjugated diene units as found in general-purpose diene rubbers. Such an arrangement is considered to be able to suppress the growth of molecular chain scission due to ozone or the like, contribute to improvement in the weather resistance, and improve the weather resistance of the entire rubber composition.

<Conjugated Diene Unit>

The conjugated diene unit of the presently disclosed multicomponent copolymer is usually a unit derived from a conjugated diene compound as a monomer. Specific examples of the conjugated diene compound include 1,3-butadiene, isoprene, 1,3-pentadiene, and 2,3-dimethyl-1,3-butadiene. Among the above, 1,3-butadiene and isoprene are preferable, and 1,3-butadiene is more preferable.

The conjugated diene compound may be used alone or in combination of two or more.

The presently disclosed multicomponent copolymer preferably contains the conjugated diene unit in an amount of 2 mol % or more and 25 mol % or less. When the content of the conjugated diene unit is 2 mol % or more, the multicomponent copolymer can work uniformly as an elastomer, thereby providing high toughness to a rubber product or a rubber composition. On the other hand, when the content is 25 mol % or less, uneven distribution of conjugated diene units can be sufficiently suppressed, thereby suppressing the deterioration in the toughness and weather resistance of the rubber product or the rubber composition. From the same viewpoint, for the presently disclosed multicomponent copolymer, the content of the conjugated diene unit is more preferably 3 mol % or more and still more preferably 5 mol % or more, and the content is preferably 20 mol % or less and more preferably 10 mol % or less.

<Non-Conjugated Olefin Unit>

The non-conjugated olefin unit of the presently disclosed multicomponent copolymer is usually a unit derived from a non-conjugated olefin compound as a monomer. Specific examples of the non-conjugated olefin compound include α-olefins such as ethylene, propylene, 1-butene, 1-pentene, 1-hexene, 1-heptene, and 1-octene; and a heteroatom-substituted alkene compound such as vinyl pivalate, 1-phenylthioethene, and N-vinylpyrrolidone. Among the above, ethylene is preferable.

The non-conjugated olefin compound may be used alone or in combination of two or more.

The presently disclosed multicomponent copolymer preferably contains the non-conjugated olefin unit in an amount of 60 mol % or more. When the content of the non-conjugated olefin unit is 60 mol % or more, the weather resistance of the rubber product or the rubber composition can be sufficiently improved. From the same viewpoint, for the presently disclosed multicomponent copolymer, the content of the non-conjugated olefin unit is more preferably 70 mol % or more.

Although there is no particular limitation on the presently disclosed multicomponent copolymer, the content of the non-conjugated olefin unit is preferably 95 mol % or less and more preferably 90 mol % or less, from the viewpoint of providing elastomeric properties (providing a certain degree of elongation and flexibility so that the presently disclosed multicomponent copolymer is different from hard and brittle resins such as PE).

<Aromatic Vinyl Unit>

Furthermore, the aromatic vinyl unit of the presently disclosed multicomponent copolymer is usually a unit derived from an aromatic vinyl compound as a monomer. Specific examples of the aromatic vinyl compound include styrene, o-methylstyrene, m-methylstyrene, p-methylstyrene, o,p-dimethylstyrene, o-ethylstyrene, m-ethylstyrene, and p-ethylstyrene. Among the above, styrene is preferable.

The aromatic vinyl compound may be used alone or in combination of two or more.

For the presently disclosed multicomponent copolymer, the content of the aromatic vinyl unit is preferably 15 mol % or less. When the content of the aromatic vinyl unit is 15 mol % or less, the weather resistance of the rubber product or the rubber composition can be sufficiently enhanced.

Although there is no particular limitation on the presently disclosed multicomponent copolymer, the content of the aromatic vinyl unit is preferably 3 mol % or more, more preferably 5 mol % or more, and still more preferably 9 mol % or more, from the viewpoint of providing elastomeric properties (providing a certain degree of elongation and flexibility so that the presently disclosed multicomponent copolymer is different from hard and brittle resins such as PE).

Note that as long as the presently disclosed multicomponent copolymer contains a conjugated diene unit, a non-conjugated olefin unit and an aromatic vinyl unit, the number of types of monomer units of the multicomponent copolymer is not particularly limited. The presently disclosed multicomponent copolymer may further contain any unit other than the conjugated diene unit, the non-conjugated olefin unit and the aromatic vinyl unit as described above. However, from the viewpoint of providing better toughness and weather resistance, the presently disclosed multicomponent copolymer is preferably a multicomponent copolymer containing one type of conjugated diene unit, one type of non-conjugated olefin unit and one type of aromatic vinyl unit. The presently disclosed multicomponent copolymer is more preferably a ternary copolymer consisting only of one type of conjugated diene unit, one type of non-conjugated olefin unit and one type of aromatic vinyl unit, and is still more preferably a ternary copolymer consisting only of a 1,3-butadiene unit, an ethylene unit, and a styrene unit.

Here, "one type of conjugated diene unit" includes conjugated diene units having different bonding modes.

<Chain Structure and Other Properties of the Multicomponent Copolymer>

In the presently disclosed multicomponent copolymer, the proportion of conjugated diene units bonded to a unit other than a conjugated diene unit out of the total conjugated diene units is 50% or more. When the proportion is less than 50%, uneven distribution of conjugated diene units cannot be suppressed, and the toughness and the weather resistance cannot be sufficiently improved. In the presently disclosed multicomponent copolymer, the proportion of conjugated diene units bonded to a unit other than a conjugated diene unit out of the total conjugated diene units is preferably 55% or more, more preferably 60% or more, and still more preferably 70% or more, from the viewpoint of further improving the toughness and the weather resistance.

In the presently disclosed multicomponent copolymer, the proportion of conjugated diene units bonded to a non-conjugated olefin unit out of the total conjugated diene units is preferably 50% or more. When the proportion is 50% or more, uneven distribution of conjugated diene units is further suppressed, and the toughness and the weather resistance of the rubber product or the rubber composition can be further improved. From the same viewpoint, in the presently disclosed multicomponent copolymer, the proportion of conjugated diene units bonded to a non-conjugated olefin unit out of the total conjugated diene units is preferably 55% or more, more preferably 60% or more, and still more preferably 70% or more.

Furthermore, in the presently disclosed multicomponent copolymer, the proportion of conjugated diene units bonded only to a conjugated diene unit out of the total conjugated diene units is preferably 40% or less. When the proportion is 40% or less, the chain structure of conjugated diene units can be reduced, and the weather resistance of the rubber product or the rubber composition can be further improved. From the same viewpoint, in the presently disclosed multicomponent copolymer, the proportion of conjugated diene units bonded only to a conjugated diene unit out of the total conjugated diene units is preferably 35% or less, and more preferably 30% or less.

The polystyrene-equivalent weight-average molecular weight (Mw) of the presently disclosed multicomponent copolymer is preferably 10,000 or more and 10,000,000 or less. When the polystyrene-equivalent weight-average molecular weight of the multicomponent copolymer is 10,000 or more, it is possible to sufficiently ensure the mechanical strength as a rubber product material. When the polystyrene-equivalent weight-average molecular weight is 10,000,000 or less, it is possible to maintain high operability. From the same viewpoint, the polystyrene-equivalent weight-average molecular weight of the presently disclosed multicomponent copolymer is more preferably 100,000 or more and still more preferably 200,000 or more, and is more preferably 1,000,000 or less and still more preferably 500,000 or less.

The weight-average molecular weight described above can be determined by gel permeation chromatography (GPC) using polystyrene as a standard substance.

The presently disclosed multicomponent copolymer may have a structure in which the conjugated diene unit, the non-conjugated olefin unit and the aromatic vinyl unit are linearly linked (linear structure), or a structure in which at least one of the conjugated diene unit, the non-conjugated olefin unit and the aromatic vinyl unit forms a branched chain and is linked (branched structure). When the presently disclosed multicomponent copolymer has a branched structure, the branched chain can also be binary or multicomponent (that is, the branched chain can contain at least two of the conjugated diene unit, the non-conjugated olefin unit and the aromatic vinyl unit).

Confirmation of whether or not it is a multicomponent copolymer containing a conjugated diene unit, a non-conjugated olefin unit and an aromatic vinyl unit can be performed by gel permeation chromatography (GPC), $^1$H-NMR, $^{13}$C-NMR, and other methods. Specifically, based on gel permeation chromatography-refractive index curve (GPC-RI curve) and gel permeation chromatography-ultraviolet absorption curve (GPC-UV curve), the UV absorption by an aromatic ring such as a benzene ring in the copolymer can be confirmed, thereby confirming the presence of an aromatic vinyl compound-derived skeleton. The presence of a unit derived from each monomer component can also be confirmed based on $^1$H-NMR spectrum or $^{13}$C-NMR spectrum.

The proportion of conjugated diene units bonded to a unit other than a conjugated diene unit, the proportion of conjugated diene units bonded to a non-conjugated olefin unit, and the proportion of conjugated diene units bonded only to a conjugated diene unit out of the total conjugated diene units in the multicomponent copolymer can be determined with the method described in the EXAMPLES section described later.

<Production of Multicomponent Copolymer>

The method of producing the presently disclosed multicomponent copolymer is not particularly limited. Therefore, the presently disclosed multicomponent copolymer containing a conjugated diene unit, a non-conjugated olefin unit and an aromatic vinyl unit may be produced, for example, by copolymerizing several predetermined types of monomers and then partially modifying the obtained copolymer (for example, hydrogenating the carbon-carbon double bond moiety to form a late-formed non-conjugated olefin unit).

However, the presently disclosed multicomponent copolymer is preferably obtained using at least a conjugated diene compound, a non-conjugated olefin compound and an aromatic vinyl compound as monomers, from the viewpoint of obtaining the desired toughness and weather resistance. The following describes an example of a method of producing the presently disclosed multicomponent copolymer using a conjugated diene compound, a non-conjugated olefin compound and an aromatic vinyl compound as monomers.

The presently disclosed multicomponent copolymer can be produced, for example, by copolymerizing a conjugated diene compound, a non-conjugated olefin compound, and an aromatic vinyl compound in the presence of a reaction mixture obtained by reacting a component (A) with a component (B), where the component (A) is a rare earth element compound represented by the following general formula (a-1):

$$M\text{-}(AQ^1)(AQ^2)(AQ^3) \qquad (a\text{-}1)$$

(where M is a scandium, yttrium or lanthanoid element; $AQ^1$, $AQ^2$ and $AQ^3$ are functional groups which may be the same or different; A is nitrogen, oxygen, or sulfur; and the general formula (a-1) has at least one M-A bond); and the component (B) is at least one compound selected from the group consisting of substituted or unsubstituted cyclopentadiene, substituted or unsubstituted indene, and substituted or unsubstituted fluorene.

—Rare Earth Element Compound (Component (A))—

The component (A) is a rare earth element compound represented by the following general formula (a-1):

$$M\text{-}(AQ^1)(AQ^2)(AQ^3) \qquad (a\text{-}1)$$

(where M is a scandium, yttrium or lanthanoid element; $AQ^1$, $AQ^2$ and $AQ^3$ are functional groups which may be the same or different; A is nitrogen, oxygen, or sulfur; and the general formula (a-1) has at least one M-A bond). Here, the lanthanoid element is specifically lanthanum, cerium, praseodymium, neodymium, promethium, samarium, europium, gadolinium, terbium, dysprosium, holmium, erbium, thulium, ytterbium, and lutetium. The component (A) has at least one M-A bond. The component (A) is a component that can improve the catalytic activity in the reaction system, thereby shortening the reaction time and raising the reaction temperature.

The component (A) may be used alone or in combination of two or more.

In particular, M is preferably gadolinium from the viewpoint of enhancing the catalyst activity and the reaction controllability.

When A is nitrogen, the functional groups represented by $AQ^1$, $AQ^2$ and $AQ^3$ (that is, $NQ^1$, $NQ^2$ and $NQ^3$) may be an amide group or the like.

Examples of the amide group include aliphatic amide groups such as a dimethylamide group, a diethylamide group, and a diisopropylamide group; arylamide groups such as a phenylamide group, a 2,6-di-tert-butylphenylamide group, a 2,6-diisopropylphenylamide group, a 2,6-dineopentylphenylamide group, a 2-tert-butyl-6-isopropylphenylamide group, a 2-tert-butyl-6-neopentylphenylamide group, a 2-isopropyl-6-neopentylphenylamide group, and a 2,4,6-tert-butylphenylamide group; and bistrialkylsilylamide groups such as a bistrimethylsilylamide group. In particular, a bistrimethylsilylamide group is preferable from the viewpoint of solubility in aliphatic hydrocarbons. The functional group may be used alone or in combination of two or more.

When A is oxygen, the rare earth element compound represented by the general formula (a-1) (that is, M-($OQ^1$)($OQ^2$)($OQ^3$)) is not particularly limited. Examples thereof include a rare earth alcoholate represented by the following formula (aI) and a rare earth carboxylate represented by the following formula (aII):

(aI)

(aII)

where in each of the formulae representing the compounds (aI) to (aII), R may be the same or different and represents an alkyl group having 1 to 10 carbon atoms.

When A is sulfur, the rare earth element compound represented by the general formula (a-1) (that is, M-($SQ^1$)($SQ^2$)($SQ^3$)) is not particularly limited. Examples thereof include a rare earth alkylthiolate represented by the following formula (aIII) and a compound represented by the following formula (aIV):

(aIII)

(aIV)

where in each of the formulae representing the compounds (aIII) to (aIV), R may be the same or different and represents an alkyl group having 1 to 10 carbon atoms.

—Compound Having a Cyclopentadiene Skeleton (Component (B))—

The component (B) is a compound having a cyclopentadiene skeleton, that is, at least one compound selected from the group consisting of substituted or unsubstituted cyclopentadiene, substituted or unsubstituted indene, and substituted or unsubstituted fluorene.

The component (B) may be used alone or in combination of two or more.

In particular, the compound having a cyclopentadiene skeleton is preferably substituted cyclopentadiene, substituted indene or substituted fluorene, and more preferably substituted indene. In this way, the bulkiness as a polymerization catalyst is advantageously increased, so that the reaction time can be shortened and the reaction temperature can be raised. In addition, because the compound having a cyclopentadiene skeleton has many conjugated electrons, the catalytic activity in the reaction system can be further improved.

Examples of the substituted cyclopentadiene include pentamethylcyclopentadiene, tetramethylcyclopentadiene, isopropylcyclopentadiene, and trimethylsilyl-tetramethylcyclopentadiene.

Examples of the substituted indene include 2-phenyl-1H-indene, 3-benzyl-1H-indene, 3-methyl-2-phenyl-1H-indene, 3-benzyl-2-phenyl-1H-indene, and 1-benzyl-1H-indene. In particular, 3-benzyl-1H-indene and 1-benzyl-1H-indene are preferable from the viewpoint of reducing the molecular weight distribution.

Examples of the substituted fluorene include trimethylsilylfluorene and isopropylfluorene.

The presently disclosed multicomponent copolymer can be produced, for example, by copolymerizing a conjugated diene compound, a non-conjugated olefin compound and an aromatic vinyl compound in the presence of a polymerization catalyst composition, where the polymerization catalyst composition contains at least one complex selected from the group consisting of a metallocene complex represented by the following general formula (I), a metallocene complex represented by the following general formula (II), and a half metallocene cation complex represented by the following general formula (III):

[Chemical formula 1]

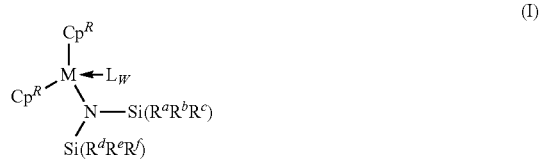
(I)

(where M represents a lanthanoid element, scandium or yttrium; each $Cp^R$ independently represents a substituted indenyl group; $R^a$ to $R^f$ each independently represent an alkyl group having 1 to 3 carbon atoms or a hydrogen atom; L represents a neutral Lewis base; and w represents an integer of 0 to 3);

[Chemical formula 2]

(II)

(where M represents a lanthanoid element, scandium or yttrium; each $Cp^R$ independently represents a substituted indenyl group; X' represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3);

[Chemical formula 2]

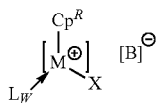
(III)

(where M represents a lanthanoid element, scandium or yttrium; $Cp^{R'}$ represents a substituted cyclopentadienyl group, a substituted indenyl group, or a substituted fluorenyl group; X represents a hydrogen atom, a halogen atom, an alkoxide group, a thiolate group, an amide group, a silyl group, or a hydrocarbon group having 1 to 20 carbon atoms; L represents a neutral Lewis base; w represents an integer of 0 to 3; and [B]$^-$ represents a non-coordinating anion).

The polymerization catalyst composition may further contain other components that are contained in a general polymerization catalyst composition containing a metallocene complex, such as a co-catalyst. Here, the metallocene complex is a complex compound in which one or more cyclopentadienyls or derivatives thereof are bonded to a central metal. The metallocene complex in which one cyclopentadienyl or its derivative is bonded to a central metal may be called a half metallocene complex.

In the polymerization system, the concentration of the complex contained in the polymerization catalyst composition is preferably within a range of 0.1 mol/L to 0.0001 mol/L.

In the metallocene complexes represented by the general formulae (I) and (II), $Cp^R$ in the formulae represents a substituted indenyl group.

$Cp^R$ having a substituted indenyl ring as a basic skeleton can be represented by $C_9H_{7-X}R_X$ or $C_9H_{11-X}R_X$, where X is the number of substituents on the substituted indenyl group and is an integer of 1 to 7 or 1 to 11. X is preferably 2 or more from the viewpoint of increasing the copolymerization ratio of the aromatic vinyl compound, and the substituent is preferably present on the 5-membered ring of the substituted indenyl group. It is preferable that each R independently represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a tert-butyl group, a phenyl group, and a benzyl group. Among the above, it is preferable that at least one R represents an aromatic group such as a phenyl group or a benzyl group from the viewpoint of increasing the copolymerization ratio of the aromatic vinyl compound. When X is 2 or more, and/or R has a bulky substituent such as an aromatic group, $Cp^R$ is more bulky, and the monomer to be polymerized approaches to the metal M, which is the catalytic center of the metallocene complexes represented by the general formulae (I) and (II), from the NSi($R^aR^bR^c$)Si ($R^dR^eR^f$) side or the SiX'$_3$ side because of steric hindrance, rendering it easy to introduce the vinyl moiety of the aromatic vinyl compound and the non-conjugated olefin compound. On the other hand, examples of the metalloid of the metalloid group include germyl Ge, stannyl Sn, and silyl Si. The metalloid group preferably has a hydrocarbyl group, and the hydrocarbyl group contained in the metalloid group is the same as the hydrocarbyl group described above. Specific examples of the metalloid group include a trimethylsilyl group. Specific examples of the substituted indenyl group include a 2-phenylindenyl group, a 2-methylindenyl group, a 1-methyl-2-phenylindenyl group, a 1,3-bis(t-butyldimethylsilyl)indenyl group, a 1-ethyl-2-phenylindenyl group, and a 1-benzyl-2-phenylindenyl group.

The two $Cp^R$ in the general formulae (I) and (II) may be the same as or different from each other.

For the half metallocene cation complex represented by the general formula (III), $Cp^{R'}$ in the formula represents a substituted cyclopentadienyl group, a substituted indenyl group, or a substituted fluorenyl group. Among the above, $Cp^{R'}$ is preferably a substituted indenyl group from the viewpoint of increasing the copolymerization ratio of the aromatic vinyl compound.

In the general formula (III), $Cp^{R'}$ having a substituted cyclopentadienyl ring as a basic skeleton can be represented by $C_5H_{5-X}R_X$. Here, X is an integer of 0 to 4. X is preferably 2 or more from the viewpoint of increasing the copolymerization ratio of the aromatic vinyl compound, and the substituent is preferably present on the 5-membered ring of the substituted indenyl group. It is preferable that each R independently represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a tert-butyl group, a phenyl group, and a benzyl group. Among the above, it is preferable that at least one R represents an aromatic group such as a phenyl group or a benzyl group from the viewpoint of increasing the copolymerization ratio of the aromatic vinyl compound. When X is 2 or more, and/or R has a bulky substituent such as an aromatic group, the vinyl moiety of the aromatic vinyl compound and the non-conjugated olefin compound can be easily introduced. On the other hand, examples of the metalloid of the metalloid group include germyl Ge, stannyl Sn, and silyl Si. The metalloid group preferably has a hydrocarbyl group, and the hydrocarbyl group contained in the metalloid group is the same as the hydrocarbyl group described above. Specific examples of the metalloid group include a trimethylsilyl group.

Specific examples of $Cp^{R'}$ having a substituted cyclopentadienyl ring as a basic skeleton include the following:

[Chemical formula 4]

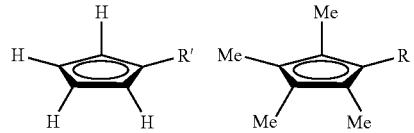

(where R' represents a methyl group or an ethyl group, and R represents a hydrogen atom, a methyl group, or an ethyl group).

In the general formula (III), $Cp^{R'}$ having a substituted indenyl ring as a basic skeleton is defined in a manner similar to $Cp^R$ in the general formula (I), and the preferred examples are also the same as those of $Cp^R$ in the general formula (I).

In the general formula (III), $Cp^R$ having a substituted fluorenyl ring as a basic skeleton can be represented by $C_{13}H_{9-X}R_X$ or $C_{13}H_{17-X}R_X$. Here, X is an integer of 1 to 9 or 1 to 17. It is preferable that each R independently represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a tert-butyl group, a phenyl group, and a benzyl group. Among the above, it is preferable that at least one R represents an aromatic group such as a phenyl group or a benzyl group from the viewpoint of increasing the copolymerization ratio of the aromatic vinyl compound. When X is 2 or more, and/or R has a bulky substituent such as an aromatic group, the vinyl moiety of the aromatic vinyl compound and the non-conjugated olefin compound can be easily introduced. On the other hand, examples of the metalloid of the metalloid group include germyl Ge, stannyl Sn, and silyl Si. The metalloid group preferably has a hydrocarbyl group, and the hydrocarbyl group contained in the metalloid group is the same as the hydrocarbyl group described above. Specific examples of the metalloid group include a trimethylsilyl group.

The central metal M in the general formulae (I), (II) and (III) is a lanthanoid element, scandium, or yttrium. The lanthanoid elements include 15 elements of atomic numbers 57 to 71, and may be any one of them. Preferred examples of the central metal M include samarium Sm, neodymium Nd, praseodymium Pr, gadolinium Gd, cerium Ce, holmium Ho, scandium Sc, and yttrium Y.

The metallocene complex represented by the general formula (I) contains a silylamide ligand [—$N(SiR_3)_2$]. R groups ($R^a$ to $R^f$ in the general formula (I)) contained in the silylamide ligand each independently represent an alkyl group having 1 to 3 carbon atoms or a hydrogen atom. It is preferable that at least one of $R^a$ to $R^f$ represents a hydrogen atom. With at least one of $R^a$ to $R^f$ representing a hydrogen atom, the catalyst can be easily synthesized and the bulk around silicon can be reduced, rendering it easy to introduce the non-conjugated olefin compound and the aromatic vinyl compound. From the same viewpoint, it is more preferable that at least one of $R^a$ to $R^c$ represents a hydrogen atom, and at least one of $R^d$ to $R^f$ represents a hydrogen atom. Furthermore, the alkyl group is preferably a methyl group.

The metallocene complex represented by the general formula (II) contains a silyl ligand [—$SiX'_3$]. X' contained in the silyl ligand [—$SiX'_3$] is defined in a manner similar to X in the general formula (III) as described below, and the preferred examples are also the same as those of X in the general formula (III).

As described above, in the general formula (III), X represents a group selected from the group consisting of a hydrogen atom, a halogen atom, an alkoxide group, a thiolate group, an amide group, a silyl group, and a hydrocarbon group having 1 to 20 carbon atoms.

In the general formula (III), the halogen atom represented by X may be any one of a fluorine atom, a chlorine atom, a bromine atom and an iodine atom, and is preferably a chlorine atom or a bromine atom. In addition, specific examples of the hydrocarbon group having 1 to 20 carbon atoms represented by X include linear or branched aliphatic hydrocarbon groups such as a methyl group, an ethyl group, a n-propyl group, an isopropyl group, a n-butyl group, an isobutyl group, a sec-butyl group, a tert-butyl group, a neopentyl group, a hexyl group, and an octyl group; aromatic hydrocarbon groups such as a phenyl group, a tolyl group, and a naphthyl group; aralkyl groups such as a benzyl group; and hydrocarbon groups containing silicon atoms such as a trimethylsilylmethyl group and a bistrimethylsi-lylmethyl group. Among the above, preferred examples include a methyl group, an ethyl group, an isobutyl group, and a trimethylsilylmethyl group.

In the general formula (III), examples of the alkoxide group represented by X include aliphatic alkoxy groups such as a methoxy group, an ethoxy group, a propoxy group, a n-butoxy group, an isobutoxy group, a sec-butoxy group, and a tert-butoxy group; and aryl oxide groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group. Among the above, a 2,6-di-tert-butylphenoxy group is preferable.

In the general formula (III), examples of the thiolate group represented by X include aliphatic thiolate groups such as a thiomethoxy group, a thioethoxy group, a thiopropoxy group, a thio-n-butoxy group, a thioisobutoxy group, a thio-sec-butoxy group, and a thio-tert-butoxy group; and arylthiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenyl group, a 2-isopropyl-6-thioneopentylphenoxy group, and a 2,4,6-triisopropylthiophenoxy group. Among the above, a 2,4,6-triisopropylthiophenoxy group is preferable.

In the general formula (III), examples of the amide group represented by X include aliphatic amide groups such as a dimethylamide group, a diethylamide group, and a diisopropylamide group; arylamide groups such as a phenylamide group, a 2,6-di-tert-butylphenylamide group, a 2,6-diisopropylphenylamide group, a 2,6-dineopentylphenylamide group, a 2-tert-butyl-6-isopropylphenylamide group, a 2-tert-butyl-6-neopentylphenylamide group, a 2-isopropyl-6-neopentylphenylamide group, and a 2,4,6-tri-tert-butylphenylamide group; and bistrialkylsilylamide groups such as a bistrimethylsilylamide group. Among the above, a bistrimethylsilylamide group is preferable.

In the general formula (III), examples of the silyl group represented by X include a trimethylsilyl group, a tris(trimethylsilyl)silyl group, a bis(trimethylsilyl)methylsilyl group, a trimethylsilyl(dimethyl)silyl group, and a triisopropyl(bistrimethylsilyl)silyl group. Among the above, a tris(trimethylsilyl)silyl group is preferable.

In the general formula (III), X preferably represents a bistrimethylsilylamide group or a hydrocarbon group having 1 to 20 carbon atoms.

In the general formula (III), examples of the non-coordinating anion represented by [B]⁻ include a tetravalent boron anion. Specific examples of the tetravalent boron anion include a tetraphenylborate, a tetrakis(monofluorophenyl)borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (triphenylpentafluorophenyl)borate, a [tris(pentafluorophenyl)phenyl]borate, and a tridecahydride-7,8-dicarbaundecaborate. Among the above, a tetrakis(pentafluorophenyl)borate is preferable.

The metallocene complexes represented by the general formulae (I) and (II) and the half metallocene cation complex represented by the general formula (III) contain 0 to 3, preferably 0 or 1, neutral Lewis bases L. Examples of the neutral Lewis base L include tetrahydrofuran, diethylether, dimethylaniline, trimethylphosphine, lithium chloride, neutral olefins, and neutral diolefins. When the complexes contain a plurality of neutral Lewis bases L, each neutral Lewis base L may be the same as or different from each other.

The metallocene complexes represented by the general formulae (I) to (II) and the half metallocene cation complex represented by the general formula (III) may be present as a monomer or as a dimer or a multimer having two or more monomers.

The metallocene complex represented by the general formula (I) can be obtained, for example, by reacting lanthanoid trishalide, scandium trishalide or yttrium trishalide with salts of indenyl (for example, potassium salts or lithium salts) and salts of bis(trialkylsilyl)amide (for example, potassium salts or lithium salts) in a solvent. The reaction temperature may be about room temperature, so that the complex can be produced under mild conditions. The reaction time is arbitrary, and may be about several hours to several tens of hours. The reaction solvent is not particularly limited. However, the solvent is preferably one that dissolves the raw materials and products, and examples thereof include toluene. The following illustrates an example of the reaction of obtaining the metallocene complex represented by the general formula (I) (where X" represents a halide).

[Chemical formula 5]

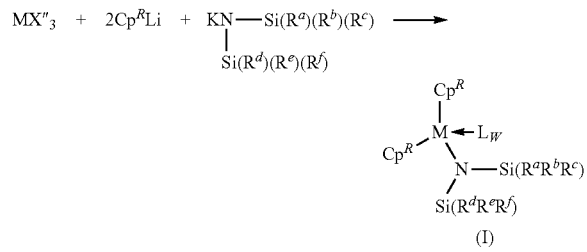

The metallocene complex represented by the general formula (II) can be obtained, for example, by reacting lanthanoid trishalide, scandium trishalide or yttrium trishalide with salts of indenyl (for example, potassium salts or lithium salts) and salts of silyl (for example, potassium salts or lithium salts) in a solvent. The reaction temperature may be about room temperature, so that the complex can be produced under mild conditions. The reaction time is arbitrary, and may be about several hours to several tens of hours. The reaction solvent is not particularly limited. However, the solvent is preferably one that dissolves the raw materials and products, and examples thereof include toluene. The following illustrates an example of the reaction of obtaining the metallocene complex represented by the general formula (II) (where X" represents a halide).

[Chemical formula 6]

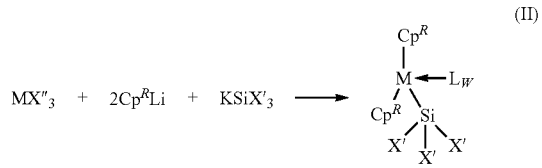

The half metallocene cation complex represented by the general formula (III) can be obtained, for example, by the following reaction.

[Chemical formula 7]

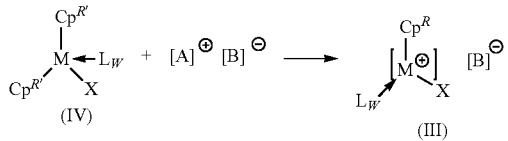

In the compound represented by the general formula (IV), M represents a lanthanoid element, scandium or yttrium; each $Cp^{R'}$ independently represents a substituted cyclopentadienyl group, a substituted indenyl group, or a substituted fluorenyl group; X represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3. In the ionic compound represented by the general formula $[A]^+[B]^-$, $[A]^+$ represents a cation, and $[B]^-$ represents a non-coordinating anion.

Examples of the cation represented by $[A]^+$ include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation. Specific examples of the tri(substituted phenyl)carbonium cation include a tri(methylphenyl)carbonium cation. Examples of the amine cation include trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri(dimethylphenyl)phosphonium cation. Among the above cations, a N,N-dialkylanilinium cation or a carbonium cation is preferable, and a N,N-dialkylanilinium cation is particularly preferable.

The ionic compound represented by the general formula $[A]^+[B]^-$ used in the reaction is preferably a compound obtained by selecting from the above-mentioned non-coordinating anions and cations respectively and combining them, and is, for example, a N,N-dimethylanilinium tetrakis (pentafluorophenyl)borate, or a triphenylcarbonium tetrakis (pentafluorophenyl)borate. The ionic compound represented by the general formula $[A]^+[B]^-$ is preferably added in an amount of 0.1-fold mol to 10-fold mol and more preferably in an amount of about 1-fold mol with respect to the metallocene complex represented by the formula (IV). When the half metallocene cation complex represented by the general formula (III) is used in a polymerization reaction, the half metallocene cation complex represented by the general formula (III) may be directly supplied to the polymerization system, or alternatively, the compound represented by the general formula (IV) and the ionic compound represented by the general formula $[A]^+[B]^-$ to be used in the reaction may be separately supplied to the polymerization system to form the half metallocene cation complex represented by the general formula (III) in the reaction system. In addition, the half metallocene cation complex represented by the general formula (III) may be formed in the reaction system by using the metallocene complex represented by the general formula (I) or (II) and the ionic compound represented by the general formula [A]⁺[B]⁻ in combination.

Structures of the metallocene complexes represented by the general formulae (I) and (II) and the half metallocene cation complex represented by the general formula (III) can be determined by X-ray crystallography.

The co-catalyst that can be used in the polymerization catalyst composition may be arbitrarily selected from components used as a co-catalyst of a general polymerization catalyst composition containing a metallocene complex. Preferred examples of the co-catalyst include aluminoxane, an organic aluminum compound, and the above-mentioned ionic compounds. These co-catalysts may be used alone or in combination of two or more.

The aluminoxane is preferably alkylaminoxane, and examples thereof include methylaluminoxane (MAO) and modified methylaluminoxane. Preferred examples of the modified methylaluminoxane include MMAO-3A (produced by Tosoh Finechem Corporation). The aluminoxane is preferably contained in the polymerization catalyst composition in an amount of about 10 to 1,000 and more preferably in an amount of about 100 at an element ratio (Al/M) of the aluminum element Al of the aluminoxane to the central metal M of the metallocene complex.

On the other hand, the organic aluminum compound is preferably an organic aluminum compound represented by a general formula of AlRR'R" (where R and R' each independently represent a hydrocarbon group having 1 to 10 carbon atoms or a hydrogen atom, and R" is a hydrocarbon group having 1 to 10 carbon atoms). Examples of the organic aluminum compound include trialkylaluminum, a dialkylaluminum chloride, an alkylaluminum dichloride, and a dialkylaluminum hydride. Among the above, trialkylaluminum is preferable. Examples of the trialkylaluminum include triethylaluminum and triisobutylaluminum. The organic aluminum compound is preferably contained in the polymerization catalyst composition in an amount of 1-fold mol to 50-fold mol and more preferably in an amount of about 10-fold mol with respect to the metallocene complex.

In the polymerization catalyst composition, the metallocene complexes represented by the general formulae (I) and (II) and the half metallocene cation complex represented by the general formula (III) may be combined with an appropriate co-catalyst respectively to increase the cis-1,4 bond content and the molecular weight of the resulting polymer.

Furthermore, in the production of a multicomponent copolymer including copolymerizing a plurality of monomers in the presence of a polymerization catalyst composition (polymerization) as described above, coupling, cleaning and other appropriate processes may also be performed as required.

<Polymerization>

The polymerization may use an arbitrary method such as a solution polymerization method, a suspension polymerization method, a liquid phase bulk polymerization method, an emulsion polymerization method, a gas phase polymerization method, and a solid phase polymerization method. When a solvent is used in the polymerization reaction, any solvent may be used as long as it is inactive in the polymerization reaction. Examples of the solvent include toluene and hexane (for example, cyclohexane and normal hexane). Among the above, hexane is preferable. Using hexane as a solvent in the polymerization can reduce the burden on the environment.

The polymerization may be performed at one stage, or at multiple stages of two or more stages. In one-stage polymerization, all types of monomers to be polymerized, that is, a conjugated diene compound, a non-conjugated olefin compound, an aromatic vinyl compound and other monomers are reacted and polymerized at the same time. Multiple-stage polymerization includes first reacting some or all of one or two types of monomers to form a polymer (first polymerization stage), and then performing one or more stages of adding the remaining types of monomers and the reminder of the one or two types of monomers for polymerization (second polymerization stage to final polymerization stage).

In the polymerization, the proportion of conjugated diene units bonded to a unit other than a conjugated diene unit out of the total conjugated diene units, the contents of units derived from each monomer (that is, the copolymerization ratio of each monomer) and others in the resulting multicomponent copolymer can be appropriately controlled, for example, by selecting an appropriate polymerization catalyst composition, controlling the charge order of each monomer, controlling the charge amount and charge method of each monomer (especially the conjugated diene compound), and controlling other reaction conditions.

The polymerization is preferably performed in an inert gas atmosphere which is preferably nitrogen gas or argon gas. The polymerization temperature of the polymerization is not particularly limited. However, it is preferably in a range of, for example, −100° C. to 200° C., and may be about room temperature. An increase in the polymerization temperature may reduce the cis-1,4 selectivity of the polymerization reaction. The polymerization is preferably performed under a pressure in a range of 0.1 MPa to 10.0 MPa so that the non-conjugated diene compound can be sufficiently introduced into the polymerization system. The reaction time of the polymerization is not particularly limited, and may be in a range of, for example, 1 second to 10 days. The reaction time can be appropriately selected according to the micro structure desired for the resulting multicomponent copolymer, the type, charge amount and charge order of each monomer, the type of the catalyst, the polymerization temperature and other conditions. The polymerization may be stopped by a terminator such as methanol, ethanol, and isopropanol.

<Coupling>

In the coupling, a reaction (coupling reaction) is performed to modify at least a part (for example, a terminal end) of the polymer chain of the multicomponent copolymer obtained in the polymerization. In the coupling, the coupling reaction is preferably performed when the polymerization reaction has reached 100%.

The coupling agent used in the coupling reaction is not particularly limited and may be appropriately selected depending on the intended use. Examples thereof include a tin-containing compound such as bis(maleic acid-1-octadecyl)dioctyltin, an isocyanate compound such as 4,4'-diphenylmethane diisocyanate, and an alkoxysilane compound such as glycidylpropyltrimethoxysilane. These coupling agents may be used alone or in combination of two or more. Among the above, bis(maleic acid-1-octadecyl) dioctyltin is preferable from the viewpoint of reaction efficiency and low gel-formation.

In addition, performing the coupling reaction can increase the weight-average molecular weight (Mw) of the resulting multicomponent copolymer.

<Cleaning>

The cleaning is performed to clean the multicomponent copolymer obtained in the polymerization. The medium used in the cleaning is not particularly limited and may be appropriately selected depending on the intended use. Examples thereof include methanol, ethanol, and isopropanol. When using a catalyst derived from a Lewis acid as the polymerization catalyst, it is possible to add an acid (such as hydrochloric acid, sulfuric acid, and nitric acid) to these solvents. The amount of acid to be added is preferably 15 mol % or less with respect to the solvent. If the acid is added in an amount exceeding 15 mol %, the acid may remain in the copolymer and have adverse effects on the reaction during kneading and vulcanization.

The cleaning can suitably reduce catalyst residue in the copolymer.

(Rubber Composition)

The presently disclosed rubber composition contains at least the presently disclosed multicomponent copolymer as a rubber component, and may further contain rubber components other than the presently disclosed multicomponent copolymer, filler, a crosslinking agent and other components as required. The presently disclosed rubber composition is excellent in toughness and weather resistance because it contains the presently disclosed multicomponent copolymer.

The proportion of the multicomponent copolymer in the rubber components contained in the rubber composition is not particularly limited and may be appropriately selected depending on the intended use. However, it is preferably 5 mass % or more, more preferably 10 mass % or more, and still more preferably 30 mass % or more, from the viewpoint of providing sufficiently excellent toughness and weather resistance.

The presently disclosed rubber composition can be used not only for tires but also for applications other than tires such as anti-vibration rubbers, seismic isolation rubbers, belts such as conveyor belts, rubber crawlers, and various hoses.

The above-mentioned rubber components other than the presently disclosed multicomponent copolymer are not particularly limited and may be appropriately selected depending on the intended use. Examples thereof include polyisoprene, butadiene rubber (BR), acrylonitrile-butadiene rubber (NBR), chloroprene rubber, ethylene-propylene rubber (EPM), ethylene-propylene-non-conjugated diene rubber (EPDM), polysulfide rubber, silicone rubber, fluoro rubber, and urethane rubber. These rubber components may be used alone or in combination of two or more.

In addition, the rubber composition may contain filler as required to, for example, improve the reinforcing properties. The content of the filler in the rubber composition is not particularly limited and may be appropriately selected depending on the intended use. It is preferable 5 parts by mass or more and 200 parts by mass or less with respect to 100 parts by mass of the rubber components. When the compounding amount of the filler is 5 parts by mass or more, the reinforcing properties can be sufficiently improved by compounding the filler. When the compounding amount of the filler is 200 parts by mass or less, it is possible to maintain favorable operability while avoiding significant reduction in low loss properties. From the same viewpoint, the content of the filler in the rubber composition is more preferably 10 parts by mass or more, still more preferably 20 parts by mass or more, and particularly preferably 30 parts by mass or more, and the content of the filler in the rubber composition is more preferably 100 parts by mass or less, still more preferably 80 parts by mass or less, and particularly preferably 60 parts by mass or less.

Examples of the filler include, without being particularly limited thereto, carbon black, silica, aluminum hydroxide, clay, alumina, talc, mica, kaolin, glass balloon, glass beads, calcium carbonate, magnesium carbonate, magnesium hydroxide, magnesium oxide, titanium oxide, potassium titanate, and barium sulfate. Among the above, silica is preferable. The filler may be used alone or in combination of two or more.

The rubber composition may use a crosslinking agent as required. The crosslinking agent is not particularly limited and may be appropriately selected depending on the intended use. The examples thereof include a sulfur-based crosslinking agent, an organic peroxide-based crosslinking agent, an inorganic crosslinking agent, a polyamine crosslinking agent, a resin crosslinking agent, a sulfur compound-based crosslinking agent, and an oxime-nitrosamine-based crosslinking agent. Among the above, a sulfur-based crosslinking agent (vulcanizing agent) is more preferable for a rubber composition used in tires.

The content of the crosslinking agent is not particularly limited and may be appropriately selected depending on the intended use. It is preferable 0.1 parts by mass and 20 parts by mass or less with respect to 100 parts by mass of the rubber components. When the content of the crosslinking agent is less than 0.1 parts by mass, crosslinking may hardly progress. On the other hand, when the content exceeds 20 parts by mass, crosslinking tends to proceed during kneading due to a part of the crosslinking agent, and the physical properties of the crosslinked product may be impaired. From the same viewpoint, the content of the crosslinking agent is more preferably 10 parts by mass or less with respect to 100 parts by mass of the rubber components.

The vulcanizing agent may be used in combination with a vulcanization accelerator. Examples of the vulcanization accelerator include a guanidine-based compound, an aldehyde-amine-based compound, an aldehyde-ammonia-based compound, a thiazole-based compound, a sulfenamide-based compound, a thiourea-based compound, a thiuram-based compound, a dithiocarbamate-based compound, and a xanthate-based compound. The presently disclosed rubber composition may, as required, further contain any known agent such as a softening agent, a vulcanizing co-agent, a colorant, a flame retardant, a lubricant, a foaming agent, a plasticizer, a processing aid, an antioxidant, an age resistor, an antiscorching agent, an ultraviolet rays-protecting agent, an antistatic agent, a color-protecting agent, and other compounding agents depending on the intended use.

(Crosslinked Rubber Composition)

The presently disclosed crosslinked rubber composition is a crosslinked product of the presently disclosed rubber composition. In other words, the presently disclosed crosslinked rubber composition is obtained by crosslinking the presently disclosed rubber composition. The presently disclosed crosslinked rubber composition is excellent in toughness and weather resistance because it uses the rubber composition containing the presently disclosed multicomponent copolymer. In addition, the presently disclosed crosslinked rubber composition can be called a vulcanized rubber composition when a sulfur-based crosslinking agent (vulcanizing agent) is used as the crosslinking agent.

The presently disclosed crosslinked rubber composition can be used not only for tires but also for applications other than tires such as anti-vibration rubbers, seismic isolation rubbers, belts such as conveyor belts, rubber crawlers, and various hoses.

The crosslinking conditions are not particularly limited and may be appropriately selected depending on the intended use. It is preferable that the temperature is 120° C. to 200° C. and the heating time is 1 minute to 900 minutes. The crosslinked rubber composition, which uses a conjugated diene compound as one of the monomers of the rubber components, is good in crosslinking properties and thus has better mechanical properties than the case of using a polymer having a non-conjugated diene compound such as EPDM as one of the monomers.

<Rubber Product>

The presently disclosed rubber product contains the presently disclosed rubber composition or the presently disclosed crosslinked rubber composition as described above. The rubber product is excellent in toughness and weather resistance because it uses the rubber composition containing the presently disclosed multicomponent copolymer.

In particular, the presently disclosed rubber product may suitably be a tire. The presently disclosed rubber composition or the presently disclosed crosslinked rubber composition may be applied, for example, to a tread, a base tread, a sidewall, a side reinforcing rubber or a bead filler of the tire, without being particularly limited thereto. Among the above, using the presently disclosed rubber composition or the presently disclosed crosslinked rubber composition in a tread is advantageous from the viewpoint of durability.

The presently disclosed tire may be produced with a conventional method. For example, the tire may be produced by successively laminating a carcass layer, a belt layer, a tread layer, which are composed of the presently disclosed rubber composition and/or cord, and other members used for the production of usual tires on a tire molding drum, withdrawing the drum to obtain a green tire, then heating and vulcanizing the green tire with a conventional method to obtain a desired tire (for example, a pneumatic tire).

Examples

The present disclosure will be described in more detail below with reference to examples, although the present disclosure is not limited to these examples.

(Synthesis of Copolymer)

First, copolymers A to E and copolymers a to d were synthesized according to the following procedure.

Synthesis Example 1: Copolymer A

A 1500 mL pressure-resistant stainless steel reactor was sufficiently dried, and 200 g of styrene as an aromatic vinyl compound and 500 g of toluene were added to the reactor.

On the other hand, 0.05 mmol of 1-benzyldimethylsilyl-3-methylindene [[1-($PhCH_2$)$Me_2$Si]-3-Me]$C_9H_6$, 0.05 mmol of a tris(bis(dimethylsilyl)amide) gadolinium complex Gd[N($SiHMe_2$)$_2$]$_3$, and 0.3 mmol of triethylaluminum were added to a glass container in a glove box under a nitrogen atmosphere, and 5 mL of toluene was added. The mixture was allowed to react at 80° C. for 6 hours. Subsequently, 0.4 mmol of diisobutylaluminumhydride and 30 mL of toluene were added, and then 0.055 mmol of a trityl tetrakis(pentafluorophenyl)borate [$Ph_3$CB($C_6F_5$)$_4$] was added to obtain a catalyst solution.

The obtained catalyst solution was added to the pressure-resistant stainless steel reactor described above and heated to 70° C.

Next, ethylene as a non-conjugated olefin compound was charged at a pressure of 1 MPa into the pressure-resistant stainless steel reactor, and at the same time, 50 g of a toluene solution containing 10 g of 1,3-butadiene as a conjugated diene compound was further charged over 3.5 hours. A polymerization reaction was performed at 70° C. for a total of 4 hours.

Subsequently, 1 mL of an isopropanol solution of 5 mass % 2,2'-methylene-bis(4-ethyl-6-t-butylphenol) (NS-5) was added to the pressure-resistant stainless steel reactor to stop the reaction, and then a large amount of methanol was used to separate the reaction product. The reaction product was dried under vacuum at 50° C. to obtain a copolymer A. The yield of the copolymer A thus obtained was 193 g.

Synthesis Example 2: Copolymer B

A 1500 mL pressure-resistant stainless steel reactor was sufficiently dried, and 60 g of styrene as an aromatic vinyl compound and 640 g of toluene were added to the reactor.

On the other hand, 0.10 mmol of 1-benzyldimethylsilyl-2-methylindene [[1-($PhCH_2$)$Me_2$Si]-2-Me]$C_9H_6$, 0.10 mmol of a tris(bis(dimethylsilyl)amide) gadolinium complex Gd[N($SiHMe_2$)$_2$]$_3$, and 0.6 mmol of trimethylaluminum were added to a glass container in a glove box under a nitrogen atmosphere, and 10 mL of toluene was added. The mixture was allowed to react at room temperature for 96 hours. Subsequently, 30 mL of toluene was added, and then 0.11 mmol of a dimethylanilinium tetrakis(pentafluorophenyl)borate [$Me_2$NHPhB($C_6F_5$)$_4$] was added to obtain a catalyst solution.

The obtained catalyst solution was added to the pressure-resistant stainless steel reactor described above and heated to 70° C.

Next, ethylene as a non-conjugated olefin compound was charged at a pressure of 1.5 MPa into the pressure-resistant stainless steel reactor, and at the same time, 100 g of a toluene solution containing 20 g of 1,3-butadiene as a conjugated diene compound was further charged over 3.5 hours. A polymerization reaction was performed at 70° C. for a total of 4 hours.

Subsequently, 1 mL of an isopropanol solution of 5 mass % 2,2'-methylene-bis(4-ethyl-6-t-butylphenol) (NS-5) was added to the pressure-resistant stainless steel reactor to stop the reaction, and then a large amount of methanol was used to separate the reaction product. The reaction product was dried under vacuum at 50° C. to obtain a copolymer B. The yield of the copolymer B thus obtained was 102 g.

Synthesis Example 3: Copolymer C

A 1500 mL pressure-resistant stainless steel reactor was sufficiently dried, and 160 g of styrene as an aromatic vinyl compound and 540 g of toluene were added to the reactor.

On the other hand, 0.07 mmol of 1-benzyldimethylsilyl-3-trimethylsilylindene [[1-($PhCH_2$)$Me_2$Si]-3-$Me_3$Si]$C_9H_6$, 0.07 mmol of a tris(bis(dimethylsilyl)amide) gadolinium complex Gd[N($SiHMe_2$)$_2$]$_3$, and 0.42 mmol of trimethylaluminum were added to a glass container in a glove box under a nitrogen atmosphere, and 7 mL of toluene was added. The mixture was allowed to react at 80° C. for 6 hours. Subsequently, 0.18 mmol of diisobutylaluminumhydride and 30 mL of toluene were added, and then 0.077 mmol of a trityl tetrakis(pentafluorophenyl)borate [$Ph_3$CB($C_6F_5$)$_4$] was added to obtain a catalyst solution.

The obtained catalyst solution was added to the pressure-resistant stainless steel reactor described above and heated to 75° C.

Next, ethylene as a non-conjugated olefin compound was charged at a pressure of 0.8 MPa into the pressure-resistant stainless steel reactor, and at the same time, 150 g of a toluene solution containing 30 g of 1,3-butadiene as a conjugated diene compound was further charged over 3.5 hours. A polymerization reaction was performed at 75° C. for a total of 4 hours.

Subsequently, 1 mL of an isopropanol solution of 5 mass % 2,2'-methylene-bis(4-ethyl-6-t-butylphenol) (NS-5) was added to the pressure-resistant stainless steel reactor to stop the reaction, and then a large amount of methanol was used to separate the reaction product. The reaction product was dried under vacuum at 50° C. to obtain a copolymer C. The yield of the copolymer C thus obtained was 121 g.

Synthesis Example 5: Copolymer E

A 1500 mL pressure-resistant stainless steel reactor was sufficiently dried, and 60 g of styrene as an aromatic vinyl compound and 640 g of cyclohexane were added to the reactor.

On the other hand, 0.05 mmol of 1-benzyldimethylsilyl-3-methylindene [[1-(PhCH$_2$)Me$_2$Si]-3-Me]C$_9$H$_6$, 0.05 mmol of a tris(bis(dimethylsilyl)amide) gadolinium complex Gd[N(SiHMe$_2$)$_2$]$_3$, and 0.3 mmol of trimethylaluminum were added to a glass container in a glove box under a nitrogen atmosphere, and 5 mL of toluene was added. The mixture was allowed to react at 80° C. for 6 hours. Subsequently, 0.4 mmol of diisobutylaluminumhydride and 30 mL of toluene were added, and then 0.055 mmol of a dimethylanilinium tetrakis(pentafluorophenyl)borate [Me$_2$NHPhB(C$_6$F$_5$)$_4$] was added to obtain a catalyst solution.

The obtained catalyst solution was added to the pressure-resistant stainless steel reactor described above and heated to 75° C.

Next, ethylene as a non-conjugated olefin compound was charged at a pressure of 1.2 MPa into the pressure-resistant stainless steel reactor, and at the same time, 25 g of a toluene solution containing 5 g of 1,3-butadiene as a conjugated diene compound was further charged over 3.5 hours. A polymerization reaction was performed at 75° C. for a total of 4 hours.

Subsequently, 1 mL of an isopropanol solution of 5 mass % 2,2'-methylene-bis(4-ethyl-6-t-butylphenol) (NS-5) was added to the pressure-resistant stainless steel reactor to stop the reaction, and then a large amount of methanol was used to separate the reaction product. The reaction product was dried under vacuum at 50° C. to obtain a copolymer E. The yield of the copolymer E thus obtained was 142 g.

Synthesis Example 6: Copolymer a

A 1500 mL pressure-resistant stainless steel reactor was sufficiently dried, and 250 g of styrene as an aromatic vinyl compound and 450 g of toluene were added to the reactor.

On the other hand, 0.25 mmol of a mono(bis(1,3-tert-butyldimethylsilyl)indenyl)bis(bis(dimethylsilyl)amide) gadolinium complex [1,3-[(t-Bu)Me$_2$Si]$_2$C$_9$H$_5$Gd[N(SiHMe$_2$)$_2$]$_2$], 0.275 mmol of a dimethylanilinium tetrakis(pentafluorophenyl)borate [Me$_2$NHPhB(C$_6$F$_5$)$_4$], and 1.4 mmol of diisobutylaluminumhydride were added to a glass container in a glove box under a nitrogen atmosphere, and 40 mL of toluene was added to obtain a catalyst solution.

The obtained catalyst solution was added to the pressure-resistant stainless steel reactor described above and heated to 80° C.

Next, ethylene as a non-conjugated olefin compound was charged at a pressure of 1.3 MPa into the pressure-resistant stainless steel reactor, and at the same time, 100 g of a toluene solution containing 20 g of 1,3-butadiene as a conjugated diene compound was further charged over 6 hours. A polymerization reaction was performed at 80° C. for a total of 8 hours.

Subsequently, 1 mL of an isopropanol solution of 5 mass % 2,2'-methylene-bis(4-ethyl-6-t-butylphenol) (NS-5) was added to the pressure-resistant stainless steel reactor to stop the reaction, and then a large amount of methanol was used to separate the reaction product. The reaction product was dried under vacuum at 50° C. to obtain a copolymer a. The yield of the copolymer a thus obtained was 153 g.

Synthesis Example 7: Copolymer b

A 1500 mL pressure-resistant stainless steel reactor was sufficiently dried, and 160 g of styrene as an aromatic vinyl compound and 540 g of toluene were added to the reactor.

On the other hand, 0.25 mmol of a mono(bis(1,3-tert-butyldimethylsilyl)indenyl)bis(bis(dimethylsilyl)amide) gadolinium complex [1,3-[(t-Bu)Me$_2$Si]$_2$C$_9$H$_5$Gd[N(SiHMe$_2$)$_2$]$_2$], 0.275 mmol of a dimethylanilinium tetrakis(pentafluorophenyl)borate [Me$_2$NHPhB(C$_6$F$_5$)$_4$], and 1.2 mmol of diisobutylaluminumhydride were added to a glass container in a glove box under a nitrogen atmosphere, and 40 mL of toluene was added to obtain a catalyst solution.

The obtained catalyst solution was added to the pressure-resistant stainless steel reactor described above and heated to 80° C.

Next, ethylene as a non-conjugated olefin compound was charged at a pressure of 1.5 MPa into the pressure-resistant stainless steel reactor, and at the same time, 150 g of a toluene solution containing 30 g of 1,3-butadiene as a conjugated diene compound was further charged over 7.5 hours. A polymerization reaction was performed at 80° C. for a total of 8 hours.

Subsequently, 1 mL of an isopropanol solution of 5 mass % 2,2'-methylene-bis(4-ethyl-6-t-butylphenol) (NS-5) was added to the pressure-resistant stainless steel reactor to stop the reaction, and then a large amount of methanol was used to separate the reaction product. The reaction product was dried under vacuum at 50° C. to obtain a copolymer b. The yield of the copolymer b thus obtained was 88 g.

Synthesis Example 8: Copolymer c

A 1500 mL pressure-resistant stainless steel reactor was sufficiently dried, and 180 g of styrene as an aromatic vinyl compound and 520 g of toluene were added to the reactor.

On the other hand, 0.25 mmol of a mono(bis(1,3-tert-butyldimethylsilyl)indenyl)bis(bis(dimethylsilyl)amide) gadolinium complex [1,3-[(t-Bu)Me$_2$Si]$_2$C$_9$H$_5$Gd[N(SiHMe$_2$)$_2$]$_2$], 0.275 mmol of a trityl tetrakis(pentafluorophenyl)borate [Ph$_3$CB(C$_6$F$_5$)$_4$], and 1.3 mmol of diisobutylaluminumhydride were added to a glass container in a glove box under a nitrogen atmosphere, and 40 mL of toluene was added to obtain a catalyst solution.

The obtained catalyst solution was added to the pressure-resistant stainless steel reactor described above and heated to 80° C.

Next, ethylene as a non-conjugated olefin compound was charged at a pressure of 1.5 MPa into the pressure-resistant stainless steel reactor, and at the same time, 200 g of a toluene solution containing 40 g of 1,3-butadiene as a conjugated diene compound was further charged over 7.5 hours. A polymerization reaction was performed at 80° C. for a total of 8 hours.

Subsequently, 1 mL of an isopropanol solution of 5 mass % 2,2'-methylene-bis(4-ethyl-6-t-butylphenol) (NS-5) was added to the pressure-resistant stainless steel reactor to stop the reaction, and then a large amount of methanol was used to separate the reaction product. The reaction product was dried under vacuum at 50° C. to obtain a copolymer c. The yield of the copolymer c thus obtained was 130 g.

Synthesis Example 9: Copolymer d

A 1500 mL pressure-resistant stainless steel reactor was sufficiently dried, and 200 g of styrene as an aromatic vinyl compound and 500 g of toluene were added to the reactor.

On the other hand, 0.25 mmol of a mono(bis(1,3-tert-butyldimethylsilyl)indenyl)bis(bis(dimethylsilyl)amide) gadolinium complex [1,3-[(t-Bu)Me$_2$Si]$_2$C$_9$H$_5$Gd[N(SiHMe$_2$)$_2$]$_2$], 0.275 mmol of a trityl tetrakis(pentafluorophenyl)borate [Ph$_3$CB(C$_6$F$_5$)$_4$], and 1.4 mmol of diisobutylaluminumhydride were added to a glass container in a glove box under a nitrogen atmosphere, and 40 mL of toluene was added to obtain a catalyst solution.

The obtained catalyst solution was added to the pressure-resistant stainless steel reactor described above and heated to 80° C.

Next, ethylene as a non-conjugated olefin compound was charged at a pressure of 1.5 MPa into the pressure-resistant stainless steel reactor, and at the same time, 50 g of a toluene solution containing 5 g of 1,3-butadiene as a conjugated diene compound was further charged over 6 hours. A polymerization reaction was performed at 80° C. for a total of 8 hours.

Subsequently, 1 mL of an isopropanol solution of 5 mass % 2,2'-methylene-bis(4-ethyl-6-t-butylphenol) (NS-5) was added to the pressure-resistant stainless steel reactor to stop the reaction, and then a large amount of methanol was used to separate the reaction product. The reaction product was dried under vacuum at 50° C. to obtain a copolymer d. The yield of copolymer d thus obtained was 124 g.

(Measurement of copolymer)

The following measurements were performed on the copolymers A to E and the copolymers a to d synthesized as described above.

<Measurement of Contents of 1,3-Butadiene Unit, Ethylene Unit and Styrene Unit>

The contents (mol %) of 1,3-butadiene unit, ethylene unit and styrene unit in the copolymers were determined from the integral ratio of each peak in $^1$H-NMR spectrum (100° C., d-tetrachloroethane standard: 6 ppm).

Specifically, the contents were determined from the integral ratio of aromatic hydrogen derived from styrene (5H: 6.4 ppm to 7.4 ppm), olefin hydrogen derived from 1,4-butadiene bond (2H: 5.3 ppm to 5.5 ppm) and each aliphatic hydrogen (styrene (3H)+butadiene (4H)+ethylene (1H): 1.4 ppm to 2.4 ppm) in the copolymers. The results are listed in Table 1.

<Measurement of the Proportion of 1,3-Butadiene Units Present in a Predetermined Arrangement>

The proportion (%) of 1,3-butadiene units present in a predetermined arrangement out of the total 1,3-butadiene units in each copolymer was determined from $^{13}$C-NMR spectrum (100° C., d-tetrachloroethane standard: 73.8 ppm).

Specifically, the integral ratio of each peak belonging to a carbon as illustrated below, which was formed by the copolymerization of 1,3-butadiene, was first determined. Note that a carbon of a butadiene bond other than the ones illustrated below was not taken into account because it was lower than the detection limit and could not be determined.

[Chemical formula 8]

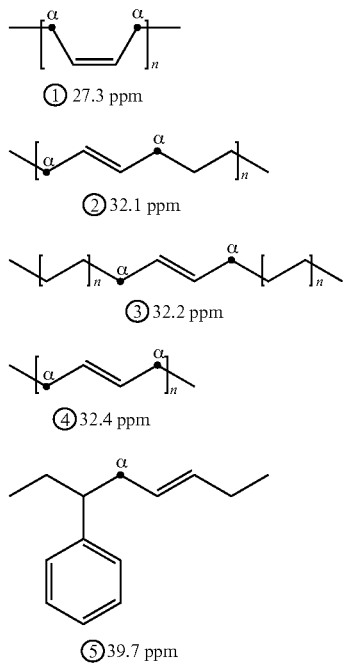

① 27.3 ppm

② 32.1 ppm

③ 32.2 ppm

④ 32.4 ppm

⑤ 39.7 ppm

The above-mentioned integral ratios were used to perform the following calculations:

(a) proportion (%) of 1,3-butadiene units bonded to an ethylene unit out of the total 1,3-butadiene units=integral of butadiene a carbon bonded to an ethylene unit (integral value of peaks of 32.1 ppm and 32.2 ppm)/integral of total butadiene a carbon (integral value of peaks of 27.3 ppm, 32.1 ppm, 32.2 ppm, 32.4 ppm and 39.7 ppm)×100

(b) proportion (%) of 1,3-butadiene units bonded only to a 1,3-butadiene unit out of the total 1,3-butadiene units=integral of butadiene a carbon bonded to butadiene (integral value of peaks of 27.3 ppm and 32.4 ppm)/integral of total butadiene a carbon (integral value of peaks of 27.3 ppm, 32.1 ppm, 32.2 ppm, 32.4 ppm and 39.7 ppm)×100

The results are listed in Table 1.

Needless to say, {100−(the proportion of (b))}(%) is the proportion of 1,3-butadiene units bonded to a unit other than a 1,3-butadiene unit out of the total 1,3-butadiene units.

Figure 2:
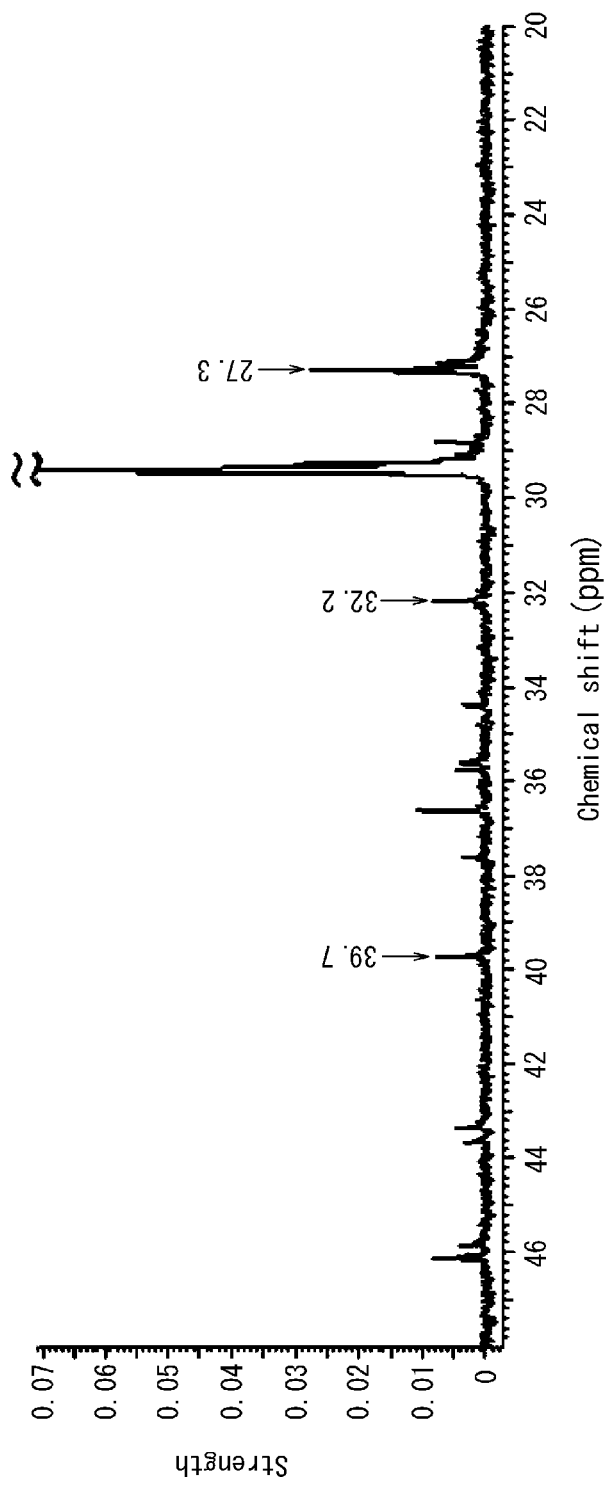
FIG. 2 illustrates a $^{13}$C-NMR spectral chart (in a range of 20 ppm to 48 ppm) of the copolymer a in the EXAMPLES section.

For reference, a $^{13}$C-NMR spectrum chart in a range of 20 ppm to 48 ppm indicating the butadiene a carbon moiety of the copolymer A is illustrated in FIG. 1, and a $^{13}$C-NMR spectrum chart in a range of 20 ppm to 48 ppm indicating the butadiene a carbon moiety of the copolymer a is illustrated in FIG. 2.

<Measurement of Weight-Average Molecular Weight>

The polystyrene-equivalent weight-average molecular weight (Mw) of each copolymer was determined by gel permeation chromatography (GPC: HLC-8121GPC/HT manufactured by Tosoh Corporation, column: two sets of GMH$_{HR}$—H(S)HT manufactured by Tosoh Corporation, detector: refractive index detector (RI), trichlorobenzene, GPC measurement temperature: 150° C.) based on monodisperse polystyrene. The results are listed in Table 1.

TABLE 1

| | Copolymer | | | | |
|---|---|---|---|---|---|
| | A | B | C | D | E |
| Content of 1,3-butadiene unit (mol %) | 6 | 10 | 16 | 23 | 2 |
| Content of ethylene unit (mol %) | 79 | 85 | 75 | 66 | 92 |
| Content of styrene unit (mol %) | 15 | 5 | 9 | 11 | 6 |
| Weight-average molecular weight (Mw) (×10$^3$) | 236 | 422 | 383 | 281 | 243 |
| Proportion (%) of 1,3-butadiene units bonded to an ethylene unit out of the total 1,3-butadiene units | 89 | 67 | 86 | 56 | 98 |
| Proportion (%) of 1,3-butadiene units bonded only to a 1,3-butadiene unit out of the total 1,3-butadiene units | 11 | 33 | 14 | 43 | 2 |

| | Copolymer | | | |
|---|---|---|---|---|
| | a | b | c | d |
| Content of 1,3-butadiene unit (mol %) | 8 | 10 | 24 | 2 |
| Content of ethylene unit (mol %) | 79 | 85 | 68 | 91 |
| Content of styrene unit (mol %) | 13 | 5 | 8 | 7 |
| Weight-average molecular weight (Mw) (×10$^3$) | 265 | 401 | 321 | 250 |
| Proportion (%) of 1,3-butadiene units bonded to an ethylene unit out of the total 1,3-butadiene units | 20 | 12 | 3 | 13 |
| Proportion (%) of 1,3-butadiene units bonded only to a 1,3-butadiene unit out of the total 1,3-butadiene units | 58 | 79 | 93 | 71 |

(Preparation of Rubber Composition and Vulcanized Rubber Composition)

In Examples 1 to 8 and Comparative Examples 1 to 7, the copolymers synthesized as described above were each used to prepare a rubber composition according to the formulation listed in Table 2. In addition, vulcanization was performed at 160° C. for 30 minutes to prepare a vulcanized rubber composition. The composition rubber components used in each example is listed in Tables 3 to 6 described later.

TABLE 2

| | Parts by mass |
|---|---|
| Rubber components (including synthesized copolymer) | 100 |
| Aromatic oil *1 | 10 |
| Silica *2 | 40 |
| Silane coupling agent *3 | 5 |
| Stearic acid | 2 |
| Age resistor *4 | 0.5 |
| Zinc white | 3 |
| Vulcanization accelerator DPG *5 | 1 |
| Vulcanization accelerator CZ *6 | 1 |
| Vulcanization accelerator DM *7 | 1 |
| Sulfur | 1.4 |

*1 Aromatic oil: "Aromax 3" produced by FUJI KOSAN COMPANY, LTD.
*2 Silica: "Nipsil AQ" produced by TOSOH SILICA CORPORATION
*3 Silane coupling agent: "Si69" produced by Degussa, bis(3-triethoxysilylpropyl) tetrasulfide
*4 Age resistor: "Ozonone 6C" produced by Seiko-Chemical Co., Ltd., N-(1,3-dimethylbutyl)-N'-phenyl-p-phenylenediamine
*5 Vulcanization accelerator DPG: "NOCCELER D" produced by Ouchi Shinko Chemical Industrial Co., Ltd., diphenylguanidine
*6 Vulcanization accelerator CZ: "NOCCELER CZ-G" produced by Ouchi Shinko Chemical Industrial Co., Ltd., N-cyclohexyl-2-benzothiazolesulfenamide
*7 Vulcanization accelerator DM: "NOCCELER DM-P" produced by Ouchi Shinko Chemical Industrial Co., Ltd., di-2-benzothiazolyl disulfide 1. Aromatic oil: "Aromax 3" produced by FUJI KOSAN COMPANY, LTD.
2. Silica: "Nipsil AQ" produced by TOSOH SILICA CORPORATION
3. Silane coupling agent: "Si69" produced by Degussa, bits(3-triethoxysilylpropyl) tetrasulfide
4. Age resistor: "Ozonone 6C" produced by Seiko-Chemical Co., Ltd., N-(1,3-dimethylbutyl)-N'-phenyl-p-phenylenediamine
5. Vulcanization accelerator DPG: "NOCCELER D" produced by Ouchi Shinko CHemical Industrial Co., Ltd., diphenylguanidine
6. Vulcanization accelerator CZ: "NOCCELER CZ-G" produced by Ouchi Shinko Chemical Industrial Co., Ltd.,
7. Vulcanization accelerator DM: "NOCCELER DM-P" produced by Ouchi Shinko Chemical Industrial Co., Ltd., di-2-benzothiazolyl disulfide (Evaluation of Vulcanized Rubber Composition)

The following evaluations were performed on the prepared vulcanized rubber compositions. The results are listed in Tables 3 to 6.

<Evaluation of toughness>

In accordance with JIS K 6251, a test piece of each vulcanized rubber composition was subjected to a tension test at room temperature to obtain a stress-strain curve until breakage. With the obtained stress-strain curve, the breaking energy (integral value of the area under the curve) was calculated. Then, the calculated value of the vulcanized rubber composition of each example was indicated as an index, where the measured value of Comparative Example 1 was taken as 100 for Example 1, the measured value of Comparative Example 2 was taken as 100 for Example 2, the measured value of Comparative Example 3 was taken as 100 for Examples 3 and 5, the measured value of Comparative Example 4 was taken as 100 for Example 4, the measured value of Comparative Example 5 was taken as 100 for Example 6, and the measured value of Comparative Example 7 was taken as 100 for Example 8, in consideration of the proportion of each unit and the approximation of the composition of rubber components in the copolymers A to E and the copolymers a to d. A large index value means that the breaking energy is high and the toughness is excellent.

<Evaluation of Weather Resistance>

In accordance with JIS K 6259, a test piece in a strip form of each vulcanized rubber composition was exposed at 40° C. and ozone concentration of 50 pphm under 20% dynamic stretching. The conditions of the test pieces after 96 hours were visually examined (for cracks). Each example was evaluated as with "no cracks", "a few cracks", "many cracks", or "broken".

TABLE 3

| | Comparative Example 1 | Example 1 | Comparative Example 2 | Example 2 |
|---|---|---|---|---|
| Type of synthesized copolymer | Copolymer a | Copolymer A | Copolymer a | Copolymer A |
| Number of parts of synthesized copolymer (parts by mass) | 100 | 100 | 30 | 30 |
| Number of parts of styrene-butadiene copolymer (parts by mass) | 0 | 0 | 70 | 70 |

TABLE 3-continued

|  | Comparative Example 1 | Example 1 | Comparative Example 2 | Example 2 |
|---|---|---|---|---|
| Evaluation of toughness | 100 | 137 | 100 | 106 |
| Evaluation of weather resistance | No cracks | No cracks | Broken | A few cracks |

TABLE 4

|  | Comparative Example 3 | Example 3 | Example 5 |
|---|---|---|---|
| Type of synthesized copolymer | Copolymer b | Copolymer B | Copolymer C |
| Number of parts of synthesized copolymer (parts by mass) | 100 | 100 | 100 |
| Number of parts of styrene-butadiene copolymer (parts by mass) | 0 | 0 | 0 |
| Evaluation of toughness | 100 | 123 | 117 |
| Evaluation of weather resistance | No cracks | No cracks | No cracks |

TABLE 5

|  | Comparative Example 4 | Example 4 | Comparative Example 5 | Example 6 |
|---|---|---|---|---|
| Type of synthesized copolymer | Copolymer b | Copolymer B | Copolymer b | Copolymer C |
| Number of parts of synthesized copolymer (parts by mass) | 50 | 50 | 70 | 70 |
| Number of parts of styrene-butadiene copolymer (parts by mass) | 50 | 50 | 30 | 30 |
| Evaluation of toughness | 100 | 109 | 100 | 121 |
| Evaluation of weather resistance | No cracks | No cracks | No cracks | No cracks |

TABLE 6

|  | Comparative Example 6 | Comparative Example 7 | Example 8 |
|---|---|---|---|
| Type of synthesized copolymer | Copolymer c | Copolymer d | Copolymer E |
| Number of parts of synthesized copolymer | 100 | 100 | 100 |
| Number of parts of styrene-butadiene copolymer | 0 | 0 | 0 |
| Evaluation of toughness | 100 | 100 | 110 |
| Evaluation of weather resistance | Many cracks | No cracks | No cracks |

From Tables 3 to 6, it can be understood that for the multicomponent copolymers containing a conjugated diene unit, a non-conjugated olefin unit and an aromatic vinyl unit, those having a proportion of 50% or more of conjugated diene units bonded to a unit other than a conjugated diene unit out of the total conjugated diene units can provide improved toughness and equal or higher weather resistance to a rubber composition than other multicomponent copolymers.

INDUSTRIAL APPLICABILITY

According to the present disclosure, it is possible to provide a polymer that can provide excellent toughness and weather resistance to a rubber composition and a rubber product such as a tire. According to the present disclosure, it is also possible to provide a rubber composition, a crosslinked rubber composition and a rubber product which are excellent in toughness and weather resistance.

The invention claimed is:

1. A multicomponent copolymer comprising a conjugated diene unit, a non-conjugated olefin unit and an aromatic vinyl unit, wherein a proportion of conjugated diene units bonded to a unit other than a conjugated diene unit out of the total conjugated diene units is 50% or more, and
    wherein a proportion of conjugated diene units bonded only to a conjugated diene unit out of the total conjugated diene units is 35% or less.

2. The multicomponent copolymer according to claim 1, wherein a proportion of conjugated diene units bonded to the non-conjugated olefin unit out of the total conjugated diene units is 50% or more.

3. The multicomponent copolymer according to claim 2, wherein the conjugated diene unit is contained in an amount of 2 mol % or more and 25 mol % or less.

4. The multicomponent copolymer according to claim 2, wherein the aromatic vinyl unit is contained in an amount of 15 mol % or less.

5. The multicomponent copolymer according to claim 2, wherein the non-conjugated olefin unit is contained in an amount of 60 mol % or more.

6. The multicomponent copolymer according to claim 2, which is obtained using a conjugated diene compound, a non-conjugated olefin compound and an aromatic vinyl compound as monomers.

7. The multicomponent copolymer according to claim 1, wherein the conjugated diene unit is contained in an amount of 2 mol % or more and 25 mol % or less.

8. The multicomponent copolymer according to claim 1, wherein the aromatic vinyl unit is contained in an amount of 15 mol % or less.

9. The multicomponent copolymer according to claim 1, wherein the non-conjugated olefin unit is contained in an amount of 60 mol % or more.

10. The multicomponent copolymer according to claim 1, which is obtained using a conjugated diene compound, a non-conjugated olefin compound and an aromatic vinyl compound as monomers.

11. The multicomponent copolymer according to claim 1, wherein the conjugated diene unit is contained in an amount of 20 mol % or less.

12. The multicomponent copolymer according to claim 1, wherein the conjugated diene unit is contained in an amount of 10 mol % or less.

13. A rubber composition comprising the multicomponent copolymer according to claim 1.

14. A crosslinked rubber composition, which is a crosslinked product of the rubber composition according to claim 13.

15. A rubber composition comprising the multicomponent copolymer according to claim 2.

16. A crosslinked rubber composition, which is a crosslinked product of the rubber composition according to claim 15.

17. A rubber product comprising the rubber composition according to claim 13.

18. The rubber product according to claim 17, which is a tire.

19. A rubber product comprising the crosslinked rubber composition according to claim 14.

20. A rubber product comprising the rubber composition according to claim 15.

* * * * *